(12) United States Patent
Sadri et al.

(10) Patent No.: US 8,320,942 B2
(45) Date of Patent: Nov. 27, 2012

(54) WIRELESS DEVICE WITH DIRECTIONAL ANTENNAS FOR USE IN MILLIMETER-WAVE PEER-TO-PEER NETWORKS AND METHODS FOR ADAPTIVE BEAM STEERING

(75) Inventors: Ali S. Sadri, San Diego, CA (US); Eduardo Casas, Duncan (CA); Duncan Kitchin, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 868 days.

(21) Appl. No.: 11/452,710

(22) Filed: Jun. 13, 2006

(65) Prior Publication Data

US 2007/0287384 A1 Dec. 13, 2007

(51) Int. Cl.
*H04W 4/00* (2009.01)
(52) U.S. Cl. ........................................ 455/466; 370/338
(58) Field of Classification Search .................. 455/63.4, 455/334, 466; 370/328, 329, 338
See application file for complete search history.

(56) References Cited

U.S. PATENT DOCUMENTS

| | | | |
|---|---|---|---|
| 3,922,682 A | 11/1975 | Hyde | |
| 4,224,626 A | 9/1980 | Sternberg | |
| 4,321,604 A | 3/1982 | Ajioka | |
| 5,206,658 A | 4/1993 | Wokurka | |
| 5,276,277 A | 1/1994 | Hightower et al. | |
| 5,426,443 A | 6/1995 | Jenness, Jr. | |
| 5,697,063 A | 12/1997 | Kishigami et al. | |
| 6,018,659 A * | 1/2000 | Ayyagari et al. | 455/431 |
| 6,320,538 B1 | 11/2001 | Lalezari et al. | |
| 6,463,090 B1 | 10/2002 | Dorfman | |
| 7,085,595 B2 | 8/2006 | Kitchin | |
| 7,130,904 B2 | 10/2006 | Kitchin | |
| 7,190,324 B2 | 3/2007 | Henderson | |
| 7,216,166 B2 | 5/2007 | Sugauchi et al. | |
| 7,245,879 B2 | 7/2007 | Sadri et al. | |
| 7,260,392 B2 | 8/2007 | Kitchin | |
| 7,286,606 B2 | 10/2007 | Maltsev et al. | |
| 7,324,605 B2 | 1/2008 | Maltsev et al. | |
| 7,333,556 B2 | 2/2008 | Maltsev et al. | |

(Continued)

FOREIGN PATENT DOCUMENTS

CN 1331895 A 1/2002

(Continued)

OTHER PUBLICATIONS

Xidong Wu; Design and Characterization of Single and Multiple Beam MM Wave Circularly Polarized Substrate Lens Antennas for Wireless Communications; Mar. 2001; vol. 49 No. 3; pp. 431 and 437.*

(Continued)

*Primary Examiner* — Michael Faragalla
(74) *Attorney, Agent, or Firm* — Schwegman, Lundberg & Woessner, P.A.

(57) ABSTRACT

Embodiments of wireless device and method for communicating in a wireless network are generally described herein. Other embodiments may be described and claimed. In some embodiments, a wireless device establishes a link using a directional antenna in an initially selected direction with another wireless device. If the link in the initially selected direction deteriorates, the link may be reestablished in a previously identified alternate direction. In some embodiments, the initially selected direction and the alternate direction are jointly selected by both the first and second wireless devices.

26 Claims, 3 Drawing Sheets

U.S. PATENT DOCUMENTS

| | | | |
|---|---|---|---|
| 7,336,716 B2 | 2/2008 | Maltsev et al. | |
| 7,349,436 B2 | 3/2008 | Maltsev et al. | |
| 7,352,696 B2 | 4/2008 | Stephens et al. | |
| 7,366,471 B1 | 4/2008 | Kitchin | |
| 7,948,428 B2 | 5/2011 | Lovberg et al. | |
| 8,149,178 B2* | 4/2012 | Alamouti et al. | 343/837 |
| 8,193,994 B2* | 6/2012 | Alamouti et al. | 343/753 |
| 2001/0026246 A1 | 10/2001 | Burnside et al. | |
| 2002/0154656 A1 | 10/2002 | Kitchin | |
| 2003/0228857 A1 | 12/2003 | Maeki | |
| 2004/0003059 A1 | 1/2004 | Kitchin | |
| 2004/0024871 A1 | 2/2004 | Kitchin | |
| 2004/0061645 A1* | 4/2004 | Seo et al. | 342/383 |
| 2004/0100981 A1 | 5/2004 | Kitchin | |
| 2004/0120301 A1 | 6/2004 | Kitchin | |
| 2004/0120428 A1 | 6/2004 | Maltsev et al. | |
| 2004/0127245 A1 | 7/2004 | Sadri et al. | |
| 2004/0242275 A1 | 12/2004 | Corbett et al. | |
| 2005/0031047 A1 | 2/2005 | Maltsev et al. | |
| 2005/0032478 A1 | 2/2005 | Stephens et al. | |
| 2005/0058057 A1 | 3/2005 | Maltsev et al. | |
| 2005/0058095 A1 | 3/2005 | Sadri et al. | |
| 2005/0068895 A1 | 3/2005 | Stephens et al. | |
| 2005/0068900 A1 | 3/2005 | Stephens et al. | |
| 2005/0135493 A1 | 6/2005 | Maltsev et al. | |
| 2005/0140563 A1 | 6/2005 | Eom et al. | |
| 2005/0141406 A1 | 6/2005 | Maltsev et al. | |
| 2005/0141412 A1 | 6/2005 | Sadri et al. | |
| 2005/0141657 A1 | 6/2005 | Maltsev et al. | |
| 2005/0143125 A1 | 6/2005 | Maltsev et al. | |
| 2005/0147076 A1 | 7/2005 | Sadowsky et al. | |
| 2005/0152328 A1 | 7/2005 | Sadri et al. | |
| 2005/0152466 A1 | 7/2005 | Maltsev et al. | |
| 2005/0157638 A1 | 7/2005 | Maltsev et al. | |
| 2005/0161753 A1 | 7/2005 | Huff et al. | |
| 2005/0190800 A1 | 9/2005 | Maltsev et al. | |
| 2005/0286544 A1 | 12/2005 | Kitchin et al. | |
| 2005/0287978 A1 | 12/2005 | Maltsev et al. | |
| 2006/0007898 A1 | 1/2006 | Maltsev et al. | |
| 2006/0067426 A1 | 3/2006 | Maltsev et al. | |
| 2006/0114816 A1 | 6/2006 | Maltsev et al. | |
| 2007/0091988 A1 | 4/2007 | Sadri et al. | |
| 2007/0097891 A1 | 5/2007 | Kitchin | |
| 2007/0099668 A1 | 5/2007 | Sadri et al. | |
| 2007/0099669 A1 | 5/2007 | Sadri et al. | |
| 2009/0219903 A1 | 9/2009 | Alamouti et al. | |
| 2009/0315794 A1 | 12/2009 | Alamouti et al. | |
| 2010/0033390 A1 | 2/2010 | Alamouti et al. | |
| 2010/0156721 A1 | 6/2010 | Alamouti et al. | |
| 2010/0214150 A1* | 8/2010 | Lovberg et al. | 342/22 |
| 2010/0231452 A1* | 9/2010 | Babakhani et al. | 342/368 |

FOREIGN PATENT DOCUMENTS

| | | |
|---|---|---|
| DE | 03840451 | 6/1990 |
| EP | 0212963 | 3/1987 |
| EP | 0212963 A2 | 3/1987 |
| EP | 0548876 A1 | 6/1993 |
| EP | 1077508 A2 | 2/2001 |
| EP | 1085599 A2 | 3/2001 |
| EP | 1650884 A1 | 4/2006 |
| FR | 2569906 | 3/1986 |
| JP | 6165605 A | 4/1986 |
| JP | 06200584 | 7/1994 |
| JP | 08-084107 | 3/1996 |
| JP | 884107 A | 3/1996 |
| JP | 8321799 A | 12/1996 |
| JP | 09051293 | 2/1997 |
| JP | 1155174 A | 2/1999 |
| JP | 2000165959 | 6/2000 |
| JP | 2000307494 A | 11/2000 |
| JP | 2001308797 | 11/2001 |
| JP | 2002534022 | 10/2002 |
| JP | 2003124942 A | 4/2003 |
| JP | 2005244362 | 9/2005 |
| JP | 2006148928 A | 6/2006 |
| KR | 20060029001 | 4/2006 |
| WO | WO9610277 A1 | 4/1996 |
| WO | WO-0038452 A1 | 1/2000 |
| WO | WO 00/38452 * | 6/2000 |
| WO | WO-0231908 A2 | 4/2002 |
| WO | WO 2004/114546 * | 12/2004 |
| WO | WO-2004114546 A1 | 12/2004 |
| WO | WO-2005050776 A2 | 6/2005 |
| WO | WO-2005114785 A1 | 12/2005 |
| WO | WO-2007136289 A1 | 11/2007 |
| WO | WO-2007136290 A1 | 11/2007 |
| WO | WO-2007136292 A1 | 11/2007 |
| WO | WO-2007136293 A1 | 11/2007 |
| WO | WO-2007146733 A1 | 12/2007 |

OTHER PUBLICATIONS

Ueda, Tetsuro, et al., "An Efficient MAC Protocol with Direction Finding Scheme in Wireless Ad Hoc Network using Directional Antenna", *Proceedings, Radio and Wireless Conference*, (Aug. 10-13, 2003), 4 pgs.

Fernandes, J., et al., "Impact of Shaped Lens antennas on MBS Systems", *Personal, indoor and Mobile Radio Communications*, 2(8) (Sep. 8, 1998), 744-748.

Holzman, E. L., "A highly compact 60-GHz lens-corrected conical antenna", *IEEE Antennas and Wireless Propagation Letters*, 3(1), (2004), 280-282.

Ueda, T., et al., "An efficient MAC protocol with direction finding scheme in wireless ad hoc network using directional antenna", *IEEE Proceedings Radio and Wireless Conference, 2003. RAWCON apos*; 03., (2003), 233-236.

Wu, X., et al., "Design and Characterization of Single-and Multiple-Beam MM-Wave Circularly Polarized Substrate Lens Antennas for Wireless Communications", *IEEE Transactions on Microwave Theory and Techniques*, 49(3), (Mar. 2001).

"European Application No. 06824417.7, Office Action mailed Aug. 14, 2009", 2 pgs.

"European Application No. 06824418.5, Office Action Mailed Jul. 29, 2009", 5 pgs.

"European Application No. 06824430.0, Office Action mailed Aug. 24, 2009", 3 pgs.

"European Application No. 06824430.0, Office Action mailed Apr. 15, 2010", 5 pgs.

"U.S. Appl. No. 12/301,792, Final Office Action mailed May 16, 2011", 13 pgs.

"U.S. Appl. No. 12/301,792, Non Final Office Action mailed Jan. 3, 2011", 12 pgs.

"U.S. Appl. No. 12/301,792, Response filed Mar. 31, 2011 to Non Final Office Action mailed Jan. 3, 2011", 12 pgs.

"Chinese Application Serial No. 200680054323.2, Office Action mailed Mar. 17, 2011", with English translation, 11 pgs.

"European Application No. 06824418.5, Response filed Feb. 8, 2010 to Office Action mailed Jul. 29, 2009", 2 pgs.

"European Application Serial No. 06824430.0, Office Action mailed Apr. 28, 2011", 6 pgs.

"European Application Serial No. 06824430.0, Response filed Feb. 8, 2010 to Office Action mailed Jul. 29, 2009", 2 pgs.

"European Application Serial No. 06835789.6, Office Action mailed Aug. 17, 2009", 2 pgs.

"Japanese Application Serial No. 2009-510911, Office Action mailed Feb. 1, 2011", with English translation, 8 pgs.

"Japanese Application Serial No. 2009-510911, Response filed May 2, 2011 to Non Final Office Action mailed Feb. 1, 2011", with English translation, 9 pgs.

"U.S. Appl. No. 12/301,556, Notice of Allowance mailed Nov. 28, 2011", 8 pgs.

"U.S. Appl. No. 12/301,556, Preliminary Amendment mailed Nov. 19, 2008", 3 pgs.

"U.S. Appl. No. 12/301,556, Response filed Oct. 28, 2011 to Restriction Requirement mailed Sep. 29, 2011", 8 pgs.

"U.S. Appl. No. 12/301,556, Restriction Requirement mailed Sep. 19, 2011", 7 pgs.

"U.S. Appl. No. 12/301,669, Non Final Office Action mailed Aug. 24, 2011", 8 pgs.

"U.S. Appl. No. 12/301,669, Preliminary Amendment filed Jan. 8, 2010", 3 pgs.

"U.S. Appl. No. 12/301,693, Non Final Office Action mailed Sep. 22, 2011", 10 pgs.

"U.S. Appl. No. 12/301,693, Preliminary Amendment filed Nov. 20. 2008", 3 pgs.

"U.S. Appl. No. 12/301,792, Preliminary Amendment filed Nov. 21, 2008", 3 pgs.

"Canadian Application Serial No. 200680054319.6, Office Action mailed Jun. 28, 2011", 14 pgs.

"Chinese Application Serial No. 200680054314.3, Office Action mailed Jul. 4, 2011", 5 pgs.

"Chinese Application Serial No. 200680054323.2, Response filed Sep. 26, 2011 to Office Action mailed Mar. 17, 2011", 22 pgs.

"Chinese Application Serial No. 200680054334.0, Office Action mailed Sep. 21, 2011", W/ English Translation, 12 pgs.

"European Application Serial No. 06824417.7, Response filed Jan. 12, 2010 to Office Action mailed Aug. 14, 2009", 13 pgs.

"European Application Serial No. 06824430.0, Response filed Mar. 3, 2010 to Office Action mailed Aug. 24, 2009", 17 pg.

"European Application Serial No. 06824430.0, Response filed Aug. 30, 2011 to Non Final Office Action dated Apr. 28, 2011", 3 pgs.

"European Application Serial No. 06835789.6, Response filed Feb. 8, 2010 to Office Action mailed Aug. 17, 2009", 36 pgs.

"International Application Serial No. PCT/RU2006/000256, International Preliminary Report on Patentability mailed Dec. 11, 2008", 8 pgs.

"International Application Serial No. PCT/RU2006/000256, International Search Report and Written Opinion mailed Feb. 27, 2007", 13 pgs.

"International Application Serial No. PCT/RU2006/000257, International Preliminary Report on Patentability mailed Dec. 11, 2008", 10 pgs.

"International Application Serial No. PCT/RU2006/000257, International Search Report and Written Opinion mailed Jun. 18, 2007", 17 pgs.

"International Application Serial No. PCT/RU2006/000257, Partial International Search Report mailed Mar. 12, 2007", 5 pgs.

"International Application Serial No. PCT/RU2006/000315, International Preliminary Report on Patentability mailed Dec. 11, 2008", 7 pgs.

"International Application Serial No. PCT/RU2006/000315, International Search Report and Written Opinion mailed Mar. 7, 2007", 13 pgs.

"International Application Serial No. PCT/RU2006/000316, International Preliminary Report on Patentability mailed Dec. 11, 2008", 9 pgs.

"International Application Serial No. PCT/RU2006/000316, International Search Report and Written Opinion mailed Mar. 21, 2007", 13 pgs.

"International Application Serial No. PCT/US2007/070588, International Search Report and Written Opinion mailed Oct. 25, 2007", 10 pgs.

"Japanese Application No. 2009510911, Office Action mailed Jul. 5, 2011", with English translation, 2 pgs.

"Japanese Application Serial No. 2009-515577, Office Action mailed May 31, 2011", with English translation, 6 pgs.

"Japanese Application U.S. Appl. No. 2009-515577, Response filed Aug. 31, 2011 to Non Final Office Action dated May 31, 2011", 8 pgs.

"U.S. Appl. No. 12/301,556, Notice of Allowability mailed Dec. 8, 2011", 2 pgs.

"U.S. Appl. No. 12/301,603, Response filed Dec. 14, 2011 to Non Final Office Action mailed Sep. 22, 2011", 10 pgs.

"U.S. Appl. No. 12/301,669, Response filed Nov. 23, 2011 to Non Final Office Action mailed Aug. 24, 2011", 8 pgs.

"U.S. Appl. No. 12/301,669, Notice of Allowance mailed Jan. 30, 2012", 8 pgs.

"U.S. Appl. No. 12/301,693, Notice of Allowance mailed Feb. 7, 2012", 9 pgs.

"Chinese Application Serial No. 200680054314.3, Office Action Response filed Nov. 21, 2011", 14 pgs.

"Chinese Application Serial No. 200680054319.6, Office Action mailed Apr. 16, 2012", With English Translation, 4 pgs.

"Chinese Application Serial No. 200680054323.2, Office Action mailed Jan. 18, 2012", 13 pgs.

"Chinese Application Serial No. 200680054323.2, Response filed Apr. 5, 2012 to Office Action mailed Jan. 18, 2012", 9 pgs.

"Chinese Application Serial No. 200680054334.0, Office Action Response filed Jan. 17, 2012", 31 pgs.

"Chinese Application Serial No. 200780017307.0, Office Action mailed Dec. 31, 2011", 8 pgs.

"Chinese Application Serial No. 200780017307.0, Office Action mailed May 16, 2012", 6 pgs.

"Chinese Application Serial No. 200780017307.0, Response filed Apr. 20, 2012 to Office Action mailed Dec. 31, 2011", 15 pgs.

"Chinese Application Serial No. 200680054319.6, Office Action Response filed Ocr. 28, 2011", 12 pgs.

"Japanese Application Serial No. 2009-515577, Final Office Action mailed Jan. 31, 2012", w/ English Translation, 6 pgs.

"Japanese Application Serial No. 2009-515577, Response filed May 31, 2012 to Final Refusal mailed Jan. 31, 2012", 10 pgs.

* cited by examiner

WIRELESS COMMUNICATION DEVICE

ANTENNA DIRECTIONS/SECTORS

WIRELESS DEVICE WITH DIRECTIONAL ANTENNAS FOR USE IN MILLIMETER-WAVE PEER-TO-PEER NETWORKS AND METHODS FOR ADAPTIVE BEAM STEERING

TECHNICAL FIELD

Some embodiments of the present invention pertain to wireless communication systems. Some embodiments of the present invention relate to wireless networks that use millimeter-wave frequencies for communications.

BACKGROUND

Many conventional wireless networks communicate using radio frequencies (RF) that generally range between two and ten gigahertz (GHz). These systems generally employ either omnidirectional or low-directivity antennas primarily, because of the comparatively long wavelengths of the frequencies and a relatively low path loss. The low directivity of these antennas may limit the throughput of such systems over longer ranges.

Due to the high path loss associated with communicating using millimeter-waves, highly directional antennas with large apertures are generally used. Highly directional antennas may be smaller and more compact at millimeter-wave frequencies and could improve the throughput of these systems. These highly directional antennas may make it difficult to establish links between wireless devices, particularly when the wireless devices are mobile. Furthermore, these highly directional antennas may make it difficult to quickly reestablish a link that has deteriorated.

Thus, there are general needs for wireless devices that can establish links using highly directional antennas as well as wireless devices that can quickly reestablish a link that has deteriorated.

DETAILED DESCRIPTION

The following description and the drawings sufficiently illustrate specific embodiments of the invention to enable those skilled in the art to practice them. Other embodiments may incorporate structural, logical, electrical, process, and other changes. Examples merely typify possible variations. Individual components and functions are optional unless explicitly required, and the sequence of operations may vary. Portions and features of some embodiments may be included in, or substituted for, those of other embodiments. Embodiments of the invention set forth in the claims encompass all available equivalents of those claims. Embodiments of the invention may be referred to herein, individually or collectively, by the term "invention" merely for convenience and without intending to limit the scope of this application to any single invention or inventive concept if more than one is in fact disclosed.

Figure 1:
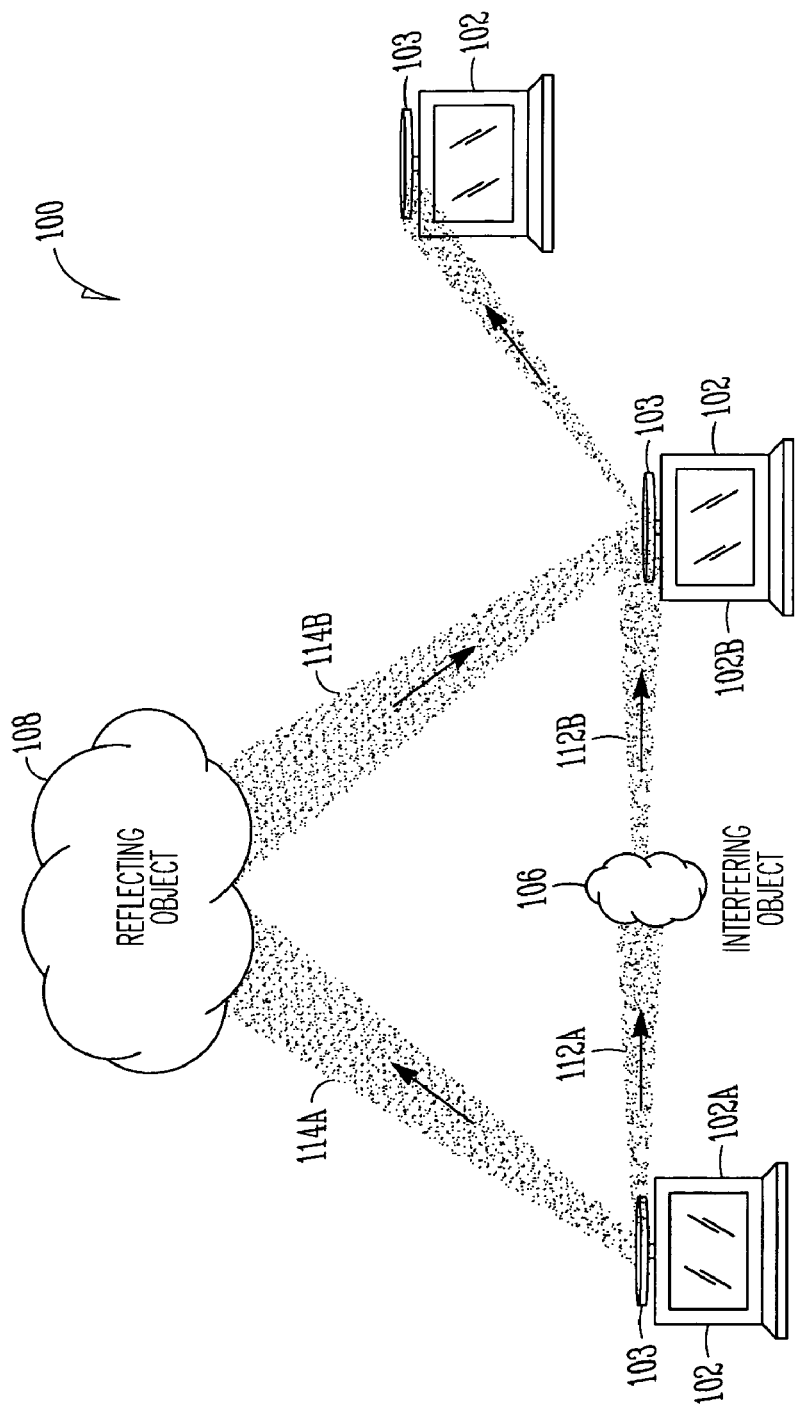
FIG. 1 illustrates a wireless network in accordance with some embodiments of the present invention.

FIG. 1 illustrates a wireless network in accordance with some embodiments of the present invention. Wireless network 100 may include one or more wireless devices 102 that may communicate with each other using directional antennas 103. In some embodiments, wireless devices 102 may use millimeter-wave signals for communicating, although the scope of the invention is not limited in this respect. In some embodiments, wireless network 100 may be a peer-to-peer (P2P) network. In other embodiments, wireless network 100 may be a mesh network in which communications may include packets routed on behalf of other wireless devices of the mesh network.

In accordance with some embodiments of the present invention, wireless devices 102 may select directions for communicating with each other using directional antennas 103 to help maximize one or more link parameters. In some embodiments, alternate directions may be selected for communicating when a link in an initially established direction deteriorates. In some embodiments, joint selection and optimization of directions for communicating may be performed by wireless devices 102. Some of these embodiments may be particularly suitable for non-line of sight (NLOS) millimeter-wave communications between wireless devices 102.

For example, wireless device 102A may identify two or more directions, such as direction 112A and direction 114A, for communicating with wireless device 102B based on signals received from wireless device 102B. In these embodiments, wireless device 102B may identify two or more directions, such as direction 112B and direction 114B, for communicating with wireless device 102A based on signals received from wireless device 102A. A link may be initially established between wireless devices 102A and 102B in selected directions (e.g., directions 112A and 112B) which may have better signal characteristics. In these embodiments, when the link deteriorates (e.g., due to the presence of interfering object 106), wireless devices 102A and 102B may reestablish the link in alternate directions (e.g., directions 114A and 114B). In this example, the reestablished link may utilize reflecting object 108 in the communication path, although the scope of the invention is not limited in this respect.

In the above example, although the initially selected directions (e.g., directions 112A and 112B) are line-of-sight (LOS) directions, and the alternate directions (e.g., directions 114A and 114B) are NLOS, the scope of the invention is not limited in this respect as NLOS directions may be the initially selected directions. In some embodiments, the initially selected direction and the alternate directions may use any combination of LOS and NLOS directions.

In some embodiments, each wireless device 102 may transmit beacon signals for receipt by one or more other wireless devices and for use in identifying two or more directions for communicating. In some embodiments, the directions may be ranked based on signal levels, although the scope of the invention is not limited in this respect. The pre-selection of two or more communication paths may allow wireless devices 102 to easily establish a link as well as quickly reestablish a link that has deteriorated. These embodiments are discussed in more detail below.

In some embodiments, the initially selected direction and the alternate direction may be selected jointly by wireless devices 102A and 102B. In some embodiments, when reestablishing the link in an alternate direction, wireless devices 102A and 102B may concurrently switch to communicating in the alternate direction.

In some embodiments, wireless device 102A may identify two or more directions for communicating with wireless device 102B based on receipt of beacon signals from wireless device 102B through directional antenna 103 of wireless device 102A. In these embodiments, wireless device 102A may transmit a beacon signal for receipt by one or more other wireless devices including wireless device 102B for use by the other devices including wireless device 102B in identifying two or more directions for communicating with wireless device 102A.

In some embodiments, wireless device 102A may notify wireless device 102B to reestablish the link in the alternate direction when the link in the initially selected direction deteriorates. In some embodiments, wireless devices 102A and 102B may agree on the directions to initially establish a link and to reestablish the link. In these embodiments, wireless devices 102A and 102B may coordinate the switching of directions when the link deteriorates in the initially established direction. In these embodiments, the processing circuitry of each wireless device may configure its directional antenna 103 to communicate in the alternate direction.

In some embodiments, when the link established in the initially selected direction fails completely, wireless devices 102A and 102B may retransmit beacon signals to each other to re-identify two or more directions for communicating. In these embodiments, when the link established in the initially selected direction fails completely, it may be difficult for one wireless device to notify the other to switch directions to reestablish the link.

In some embodiments, wireless devices 102 may establish links with more than one other wireless device of wireless network 100. For example, wireless device 102B may establish a link with wireless device 102A and with another of wireless devices 102. In these embodiments, directional antenna 103 of wireless device 102B may be used to identify two or more directions for communicating with wireless device 102A and to identify two or more directions for communicating with another of wireless devices 102, although the scope of the invention is not limited in this respect.

Figure 2:
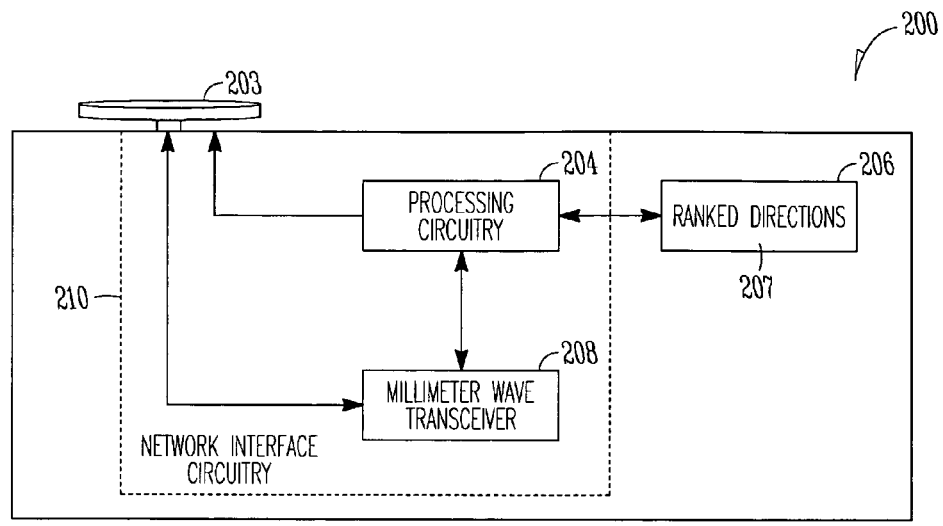
FIG. 2 is a functional block diagram of a wireless device in accordance with some embodiments of the present invention.

FIG. 2 is a functional block diagram of a wireless device in accordance with some embodiments of the present invention. Wireless device 200 may be suitable for any one or more of wireless devices 102 (FIG. 1), although the scope of the invention is not limited in this respect. Wireless device 200 includes millimeter-wave transceiver 208 for processing signals received by directional antenna 203 and for generating millimeter-wave signals for transmission by directional antenna 203. Directional antenna 203 may correspond to any one of directional antennas 103 (FIG. 1), although the scope of the invention is not limited in this respect. Wireless device 200 may also include processing circuitry 204 which may configure directional antenna 203 for receiving and/or transmitting in a selected direction. Processing circuitry 204 may also identify directions for communicating with other wireless devices, rank the directions based on signal levels, and coordinate the directional communications with another wireless device in one of the selected directions. These embodiments are described in more detail below.

In some embodiments, processing circuitry 204 and millimeter-wave transceiver 208 may be part of network interface circuitry 210, which may be in the form of a network interface card (NIC), although the scope of the invention is not limited in this respect. In these embodiments, the NICs may be installed in communication devices to allow the communication devices to communicate using millimeter-waves using directional antennas as described herein. In some embodiments, processing circuitry 204 may include a baseband processor as well as other signal processing circuitry.

Referring to FIGS. 1 and 2, in some embodiments, directional antenna 203 may be used for both receiving and transmitting, while in other embodiments, separate directional antennas may be used for receiving and transmitting. In some embodiments, a substantially omnidirectional antenna may be used for transmitting and/or receiving beacon signals discussed in more detail below.

In some embodiments, processing circuitry 204 of wireless device 102A and processing circuitry 204 of wireless device 102B may select directions for communicating to maximize one or more link parameters. In some embodiments, wireless devices 102A and 102B may select initial directions with the greatest signal level for establishing an initial link, and may select alternate directions with the next greatest signal levels for communicating when the first link deteriorates. In some embodiments, processing circuitry 204 may identify two or more directions by using directional antenna 203 to scan in a plurality of directions to identify two or more best directions for communicating with at least some of the other communication stations in the network.

In some embodiments, wireless device 102A may notify wireless device 102B to select an alternate direction, and wireless device 102B may responsively select the alternate direction for communicating with wireless device 102A. In some embodiments, wireless device 102A may notify wireless device 102B using a request-to-send (RTS)/clear-to-send (CTS) type of signaling over a control channel, although the scope of the invention is not limited in this respect. In these embodiments, wireless devices 102A and 102B may rendezvous with each other to coordinate the selection and switching of directions for communicating. In some embodiments, processing circuitry 204 of wireless device 102A may use its directional antenna 203 to notify wireless device 102B that wireless device 102A will be selecting a predetermined alternate direction. In some other embodiments, an omnidirectional antenna may be used.

In some embodiments, wireless devices 102 may communicate using a control channel that is separate from a data channel used for communicating data, although the scope of the invention is not limited in this respect. In these embodiments, the control channel may be used to coordinate the selection of directions for communicating and to coordinate the switching of directions for communicating. In some embodiments, the control channel may be at microwave frequencies, while the data channel may be a high-throughput channel at millimeter-wave frequencies, although the scope of the invention is not limited in this respect. In some other embodiments, the control channel may also be at millimeter-wave frequencies. In some of these embodiments, high-throughput data may be transmitted over millimeter-wave frequency channel and control information may be sent back on a microwave-frequency control channel. In some of these embodiments, the microwave-frequency control channel may be used to coordinate directional switching even when the millimeter-wave date channel fails completely, although the scope of the invention is not limited in this respect.

In some of these embodiments, wireless device 102A may be a transmitting station that may only be capable of transmitting data. In these embodiments, wireless device 102B may be a receiving station that may only be capable of receiving data, although the scope of the invention is not limited in this respect.

In some embodiments, processing circuitry 204 may configure directional antenna 203 to communicate in an initial direction to establish a link after the initial direction is selected. In these embodiments, processing circuitry 204 may also configure directional antenna 203 to communicate in an alternate direction to establish a second link with the second wireless communication after the alternate direction is selected. In these embodiments, communications with wireless device 102B may be quickly reestablished in the alternate direction with a next-greatest signal level when the link in the initial direction deteriorates.

In some embodiments, processing circuitry 204 of wireless device 102A identifies the two or more directions based on a beacon signal received from wireless device 102B. In these embodiments, wireless device 102A may further transmit the beacon signal for receipt and for use by wireless device 102B in identifying the initial and alternate directions. In some embodiments, when a currently established link fails completely, either or both wireless devices may resend the beacon signal to reevaluate the link characteristics in the different directions, although the scope of the invention is not limited in this respect. In some embodiments, the beacon signals may be sent over the data channel discussed above.

In some embodiments, wireless device 102A may transmit the beacon signal substantially omnidirectionally, and/or wireless device 102B may transmit the beacon signal substantially omnidirectionally, although the scope of the invention is not limited in this respect. In some alternate embodiments, processing circuitry 204 may configure directional antenna 203 to separately transmit the beacon signal in each of the directions of the plurality to help the other communication device identify two or more directions with greater signal levels. In some embodiments, when wireless device 102A uses directional antenna 203 to transmit the beacon signal in each of a plurality of directions, the beacon signal may indicate the direction or sector in which the beacon signal is transmitted. In these embodiments, the indicator may be used by wireless device 102B to identify the particular direction or sector and to request that wireless device 102B transmit in that direction, although the scope of the invention is not limited in this respect. In some embodiments, the beacon signal may be a preamble or a preamble symbol with known training values, such as a preamble of an orthogonal frequency division multiplexed (OFDM) symbol, although the scope of the invention is not limited in this respect.

In some embodiments, wireless devices 102 may transmit beacon signals at a low rate as part of a background activity after link establishment. In these embodiments, one or more alternate directions may be identified and selected on a continuous or regular basis. In some of these embodiments, a list of ranked directions or directional matrices may be regularly updated as the communication environment changes, although the scope of the invention is not limited in this respect. In some of these embodiments, wireless devices 102A and 102B may agree on alternate directions based on the regularly transmitted beacon signals during the communication over an established link.

In some embodiments, processing circuitry 204 may include a baseband processor that may receive signals omnidirectionally using a phased-array antenna. In these embodiments, the baseband processor may identify the angle-of-arrival of the received signals to identify the one or more directions discussed above.

In some embodiments, directional antenna 203 may comprise a sectorized antenna (illustrated in FIG. 3 discussed below) for communicating within a plurality of sectors. In these embodiments, the two or more directions correspond to two or more sectors of directional antenna 203. In some of these embodiments, directional antenna 203 may be responsive to control signals provided by processing circuitry 204 to communicate in a selected one or more of the sectors.

In some embodiments, directional antenna 203 may be an electronically steerable antenna responsive to control signals provided by processing circuitry 204 to communicate in a selected one of the directions. In some of these embodiments, directional antenna 203 comprises one of a phased array antenna, a horn antenna, a reflector antenna, a slot antenna, a chip-lens array antenna, a chip-array reflector antenna, or a slotted-waveguide antenna. In some of these embodiments, directional antenna 203 is configurable by processing circuitry 204 to communicate signals within a plurality of directions in azimuth. In some embodiments, directional antenna 203 may also be configurable by processing circuitry 204 to communicate signals within a plurality of directions in elevation.

In some embodiments, directional antenna 203 may be a chip-lens array antenna comprising a millimeter-wave lens and a chip-array comprising an array of antenna elements. In these embodiments, the chip-array may generate an incident beam of millimeter-wave signals. In these embodiments, the array of antenna elements may be coupled to beam-steering circuitry (e.g., part of processing circuitry 204) to direct the incident beam within the millimeter-wave lens. The lens may direct the millimeter-wave signals for communication a selected direction. In some of these embodiments, the millimeter-wave lens may comprise millimeter-wave refractive material disposed directly over the chip-array, although the scope of the invention is not limited in this respect.

In some other embodiments, directional antenna 203 may be a chip-array reflector antenna comprising an internal millimeter-wave reflector and a chip-array comprising an array of antenna elements to generate an incident beam of millimeter-wave signals. The array of antenna elements may be coupled to the beam-steering circuitry to direct the incident beam at an internal millimeter-wave reflector for communication in a selected direction, although the scope of the invention is not limited in this respect.

In some alternate embodiments, directional antenna 203 may be a mechanically steerable antenna. In these embodiments, directional antenna 203 may be responsive to control signals provided by processing circuitry 204 to communicate in a selected direction, although the scope of the invention is not limited in this respect.

In some embodiments, processing circuitry 204 may determine that the link established in the initially selected direction is deteriorating based on the level of signals received through directional antenna 203 in the initially selected direction from second wireless device 102B. In some embodiments, the signal level comprises at least one of a power level, signal-to-noise ratio (SNR), a signal-to-noise and interference ratio (SINR), a packet-error rate (PER), or a throughput level. In some embodiments, processing circuitry 204 of either communication device 102A or communication device 102B may initial the switching to a predetermined alternate direction when the level of the signals received through its directional antenna 203 in the initially selected direction falls below a predetermined level for at least a predetermined period of time (e.g., 3-5 milliseconds), although the scope of the invention is not limited in this respect.

In some embodiments, processing circuitry 204 may also generate a list of ranked directions 207 for storage in memory 206 based on a signal level of the millimeter-wave signals received through directional antenna 203 in each of the directions from wireless device 102B. In some embodiments, processing circuitry 204 may generate a power matrix for each of one or more destination nodes of a peer-to-peer or mesh network based on received signals from each destination node through directional antenna 203 in at least two or more directions. In these embodiments, the directions for communicating with each node in the network may be selected based on the power matrix. In some embodiments, the power matrix ranks or lists directions based on received signal levels for each destination node.

Although wireless device 200 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), and combinations of various hardware and logic circuitry for performing at least the functions described herein. In some embodiments, the functional elements of system wireless device 200 may refer to one or more processes operating on one or more processing elements.

Figure 3:
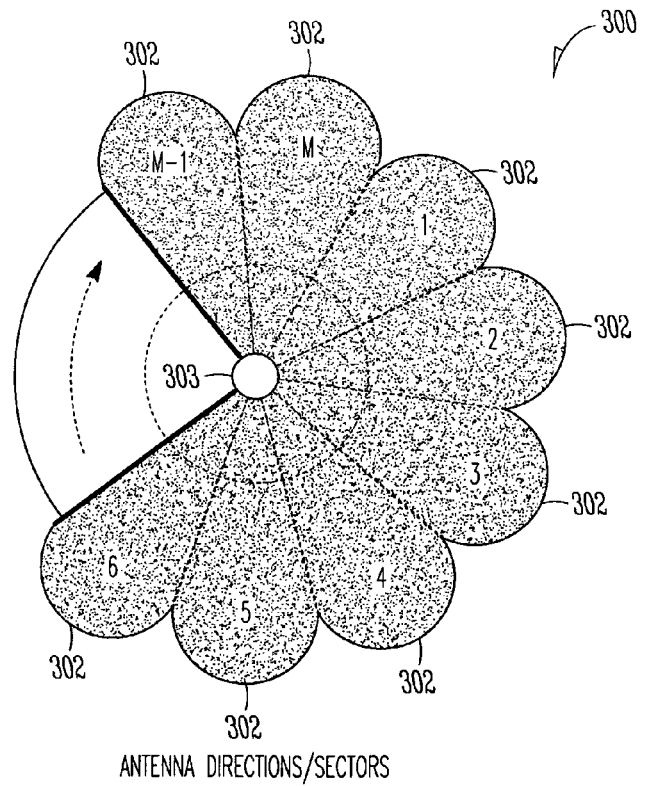
FIG. 3 illustrates antenna directions in accordance with some embodiments of the present invention.

FIG. 3 illustrates antenna directions 300 in accordance with some embodiments of the present invention. Directional antenna 303 may be configured to communicate in one or more of directions 302 in azimuth. Directional antenna 303 may be suitable for use as any one or more of directional antennas 103 (FIG. 1), although the scope of the invention is not limited in this respect. In some sectorized antenna embodiments, each direction 302 may correspond to one sector of directional antenna 303. In FIG. 3, directional antenna 303 is illustrated as being capable of scanning in M directions or sectors. In some embodiments, the number of M directions or sectors may range from as few as two to up to ten or more. In some non-sectorized embodiments, when directional antenna 303 is an electronically steerable antenna, directional antenna 303 may be configured to scan and communicate in many more directions in azimuth and/or elevation.

In some embodiments, processing circuitry 204 (FIG. 2) may configure directional antenna 303 to scan in each of directions 302 to receive a beacon signal transmitted by another wireless device. The directions may be ranked based on the signal levels of the received beacon signal.

Figure 4:
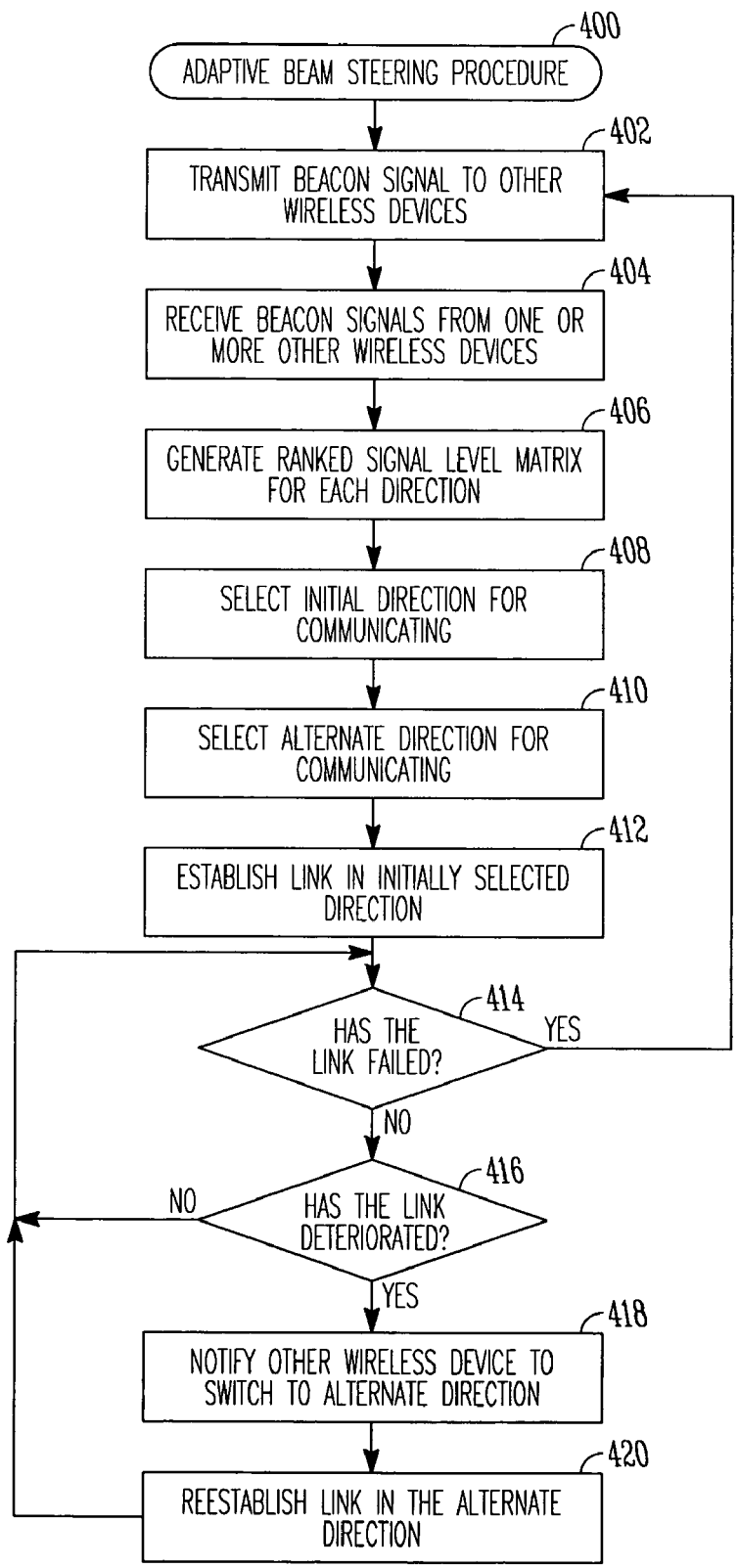
FIG. 4 is a flow chart of an adaptive beam steering procedure in accordance with some embodiments of the present invention.

FIG. 4 is a flow chart of an adaptive beam steering procedure in accordance with some embodiments of the present invention. Adaptive beam steering procedure 400 may be performed by any one or more of wireless devices 102 (FIG. 1) for communicating with other wireless devices 102 (FIG. 1) in network 100 (FIG. 1). In some embodiments, each wireless device 102 (FIG. 1) of a pair of wireless devices that wish to establish a link therebetween may concurrently perform adaptive beam steering procedure 400. In some embodiments, processing circuitry 204 (FIG. 2) and/or millimeter-wave transceiver 208 (FIG. 2) may perform the various operations of procedure 400.

In operation 402, a beacon signal is transmitted for receipt by one or more other wireless devices of the network. In some embodiments, the beacon signal may be transmitted omnidirectionally.

In operation 404, a beacon signal may be received from one or more other wireless devices of the network. In operation 404, the wireless device may configure directional antenna 103 to scan two or more directions to receive the beacon signal from the one or more other wireless devices.

In operation 406, a ranked power level matrix may be generated for each direction. In some embodiments, the directions may be ranked based on receipt of the beacon signal in operation 404. In some embodiments, the ranked power level matrix may include ranked directions for each wireless device in the network from which a beacon signal is received.

In operation 408, an initial direction may be selected for communicating with another wireless device. In some embodiments, the selection of an initial direction may be coordinated with the other wireless device to maximize one or more link parameters.

In operation 410, one or more alternate directions for communicating with another wireless device may be selected. In some embodiments, the selection of the alternate directions may also be coordinated with the other wireless device to maximize one or more link parameters.

In operation 412, a link may be established in the initially selected direction. As part of establishing the link, processing circuitry 204 (FIG. 2) may configure directional antenna 203 (FIG. 2) to communicate in the initially selected direction.

In operation 414, the wireless device determines if the link has failed. When the link has not failed, operation 416 is performed. When the link has failed, operations 402 through 412 may be repeated. A link has failed when communications are no longer reasonably able to take place over the link.

In operation 416, the wireless device determines if the link has deteriorated. When the link has not deteriorated, the wireless devices may continue to communicate over the link and operations 414 and 416 may be repeated. When the link has deteriorated, operation 418 may be performed.

In operation 418, the wireless device may notify the other wireless device to switch to one of the alternate directions selected in operation 408. In some embodiments, a separate control channel may be used to notify the other wireless device to switch to one of the alternate directions.

In operation 420, the link is reestablished the alternate direction. After operation 420, communications may continue over the reestablished link until either the link fails or deteriorates.

Although the individual operations of procedure 400 are illustrated and described as separate operations, one or more of the individual operations may be performed concurrently, and nothing requires that the operations be performed in the order illustrated.

Referring to FIG. 1, in some embodiments, wireless devices 102 may communicate multicarrier signals, such as OFDM communication signals, over a multicarrier communication channel. The multicarrier communication channel may be within a predetermined frequency spectrum and may comprise a plurality of orthogonal subcarriers. In some embodiments, wireless devices 102 may communicate in accordance with a multiple access technique, such as orthogonal frequency division multiple access (OFDMA), although the scope of the invention is not limited in this respect. In some embodiments, wireless devices 102 may communicate using spread-spectrum signals, although the scope of the invention is not limited in this respect.

In some embodiments, wireless devices 102 may be portable wireless devices, such as personal digital assistants (PDAs), laptops or portable computers with wireless communication capability, web tablets, wireless telephones, wireless headsets, pagers, instant messaging devices, digital cameras, access points, televisions, medical devices (e.g., a heart rate monitor, a blood pressure monitor, etc.), or other devices that may receive and/or transmit information wirelessly.

In some embodiments, wireless devices 102 may communicate using the millimeter-wave signals comprising millimeter-wave frequencies between approximately 57 and 90 gigahertz (GHz). In some embodiments, the millimeter-wave signals may be multicarrier signals. Although many embodiments of the present invention are directed to using millimeter-wave signals, the scope of the invention is not limited in this respect as other frequencies may also be suitable.

In some alternate embodiments, the frequency spectrums for the signals communicated by wireless devices 102 may comprise a 5 GHz frequency spectrum and/or a 2.4 GHz frequency spectrum. In these embodiments, the 5 GHz frequency spectrum may include frequencies ranging from approximately 4.9 to 5.9 GHz, and the 2.4 GHz spectrum may include frequencies ranging from approximately 2.3 to 2.5 GHz, although the scope of the invention is not limited in this respect, as other frequency spectrums are also equally suitable. In some BWA network embodiments, the frequency spectrum for the communication signals may comprise frequencies between 2 and 11 GHz, although the scope of the invention is not limited in this respect.

In some embodiments, any of wireless devices 102 may be part of a communication station, such as wireless local area network (WLAN) communication station including a Wireless Fidelity (WiFi) communication station, an access point (AP), or a mobile station (MS). In some other embodiments, any of wireless devices 102 may be part of a broadband wireless access (BWA) network communication station, such as a Worldwide Interoperability for Microwave Access (WiMax) communication station, although the scope of the invention is not limited in this respect.

In some embodiments, wireless devices 102 may communicate millimeter-wave signals in accordance with specific communication standards or proposed specifications, such as the Institute of Electrical and Electronics Engineers (IEEE) standards including the IEEE 802.15 standards and proposed specifications for millimeter-wave communications (e.g., the IEEE 802.15 task group 3c 'Call For Intent' (CFI) dated December 2005), although the scope of the invention is not limited in this respect as they may also be suitable to transmit and/or receive communications in accordance with other techniques and standards. For more information with respect to the IEEE 802.15 standards, please refer to "IEEE Standards for Information Technology—Telecommunications and Information Exchange between Systems"—Part 15.

Unless specifically stated otherwise, terms such as processing, computing, calculating, determining, displaying, or the like, may refer to an action and/or process of one or more processing or computing systems or similar devices that may manipulate and transform data represented as physical (e.g., electronic) quantities within a processing system's registers and memory into other data similarly represented as physical quantities within the processing system's registers or memories, or other such information storage, transmission or display devices. Furthermore, as used herein, a computing device includes one or more processing elements coupled with computer-readable memory that may be volatile or non-volatile memory or a combination thereof.

Some embodiments of the invention may be implemented in one or a combination of hardware, firmware and software. Some embodiments of the invention may also be implemented as instructions stored on a computer-readable storage medium, which may be read and executed by at least one processor to perform the operations described herein. A computer-readable storage medium may include any mechanism for storing information in a form readable by a machine (e.g., a computer). For example, a computer-readable storage medium may include read-only memory (ROM), random-access memory (RAM), magnetic disk storage media, optical storage media, flash-memory devices, and others.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims.

In the foregoing detailed description, various features are occasionally grouped together in a single embodiment for the purpose of streamlining the disclosure. This method of disclosure is not to be interpreted as reflecting an intention that the claimed embodiments of the subject matter require more features than are expressly recited in each claim. Rather, as the following claims reflect, invention may lie in less than all features of a single disclosed embodiment. Thus, the following claims are hereby incorporated into the detailed description, with each claim standing on its own as a separate preferred embodiment.

What is claimed is:

1. A method performed by a first wireless device for communicating with a second wireless device in a peer-to-peer millimeter-wave network, the method comprising:

identifying two or more directions for communicating with the second wireless device based on receipt of beacon signals from the second wireless device through a directional antenna, the two or more directions including an initially selected direction and an alternate direction and identified prior to establishment of a link;

establishing, by the first wireless device, a link with the directional antenna in the initially selected direction with the second wireless device; and reestablishing the link in the alternate direction with the directional antenna when the link in the initially selected direction deteriorates as indicated by the level of signals received through the directional antenna in the initially selected direction falling below a predetermined level for at least a predetermined period of time, the link being automatically reestablished in the alternate direction by performing beam steering with the directional antenna and without regard to signal quality of the link in the alternate direction at the time of reestablishment, wherein the alternate direction is a predetermined non-line of sight (NLOS) direction that is different from the initially selected direction for use in reestablishing the link over a different communication path.

2. The method of claim 1 further comprising notifying the second wireless device to reestablish the link in the alternate direction when the link in the initially selected direction deteriorates, wherein when reestablishing the link in the alternate direction, the first and second wireless devices concurrently switch to communicating in the alternate direction based on the notification.

3. The method of claim 2 further comprising:

transmitting a beacon signal for receipt by one or more other wireless devices including the second wireless device for use by the one or more other wireless devices in initially identifying the two or more directions for communicating with the first wireless device before establishment of the link.

4. The method of claim 2 wherein the initially selected direction and the alternate direction are identified based on one or more link parameters, and wherein the method further comprises:

agreeing with the second wireless device on the initially selected direction and the alternate direction to initially establish the link and to reestablish the link respectively; and coordinating the switching to the alternate direction when the link deteriorates in the initially established direction.

5. The method of claim 3 further comprising retransmitting a beacon signal to the second wireless device and re-receiving a beacon signal from the second wireless device when the link fails; and
wherein the first and second wireless devices re-identify two or more directions for communicating based on receipt of the beacon signals.

6. The method of claim 1 wherein the link comprises a data channel at millimeter-wave frequencies, and
wherein notifying comprises notifying the second wireless device using a control channel at a microwave frequency.

7. A wireless device configured to communicate with a second wireless device in a peer-to-peer millimeter-wave network, the wireless device comprising:
a directional antenna configurable to communicate signals within each of a plurality of directions;
processing circuitry to identify two or more directions for communicating with the second wireless device based on receipt of beacon signals from the second wireless device through the directional antenna, the two or more directions including an initially selected direction and an alternate and identified prior to establishment of a link; and
a millimeter-wave transceiver to establish a link with the directional antenna in the initially selected direction with the second wireless device and to reestablish the link in the alternate direction with the directional antenna when the link in the initially selected direction deteriorates as indicated by the level of signals received through the directional antenna in the initially selected direction falling below a predetermined level for at least a predetermined period of time, the link being automatically reestablished in the alternate direction by performing beam steering with the directional antenna and without regard to signal quality of the link in the alternate direction,
wherein the alternate direction is a predetermined non-line of sight (NLOS) direction that is different from the initially selected direction for use in reestablishing the link over a different communication path.

8. The wireless device of claim 7 wherein the wireless device is a first wireless device,
wherein the second wireless device also identifies the two or more directions for communicating with the first wireless device and selects the alternate direction for communicating with the first wireless device when the link established in the initially selected direction with the first wireless device deteriorates.

9. The wireless device of claim 8 wherein the first and second wireless devices:
agree on the initially selected direction to establish the link,
further agree on the alternate direction to reestablish the link, and
coordinate the switching to communicating in the alternate direction when the link established in the initially selected direction deteriorates.

10. The wireless device of claim 8 wherein the link is established over a high-throughput data channel at millimeter-wave frequencies, and
wherein the first and second wireless devices coordinate the switching using a control channel at a microwave frequency.

11. The wireless device of claim 8 wherein the processing circuitry of the first wireless device and processing circuitry of the second wireless device select directions for communicating based on one or more link parameters.

12. The wireless device of claim 8 wherein the first and second wireless devices switch to communicating in the alternate direction substantially concurrently, and
wherein the first wireless device identifies the two or more directions for communicating with the second wireless device based on signal levels of signals received from the second wireless device through the directional antenna, and
wherein the second wireless device identifies the two or more directions for communicating with the first wireless device based on signal levels of signals received from the first wireless device.

13. The wireless device of claim 11 wherein the first wireless device notifies the second wireless device to select the alternate direction, and
wherein the second wireless device responsively selects the alternate direction for communicating with the first wireless device.

14. The wireless device of claim 8 wherein the processing circuitry of the first wireless device initially identifies the two or more directions based on a beacon signal received from the second wireless device prior to establishment of the link,
wherein the first wireless device further transmits the beacon signal for receipt by the second wireless device for use by the second wireless device in identifying the initially selected and alternate directions, and
wherein subsequent beacon signals are transmitted as part of a background activity after the link is established to re-identify one or more directions for communicating.

15. The wireless device of claim 7 wherein the directional antenna comprises a sectorized antenna for communicating within a plurality of sectors, wherein the two or more directions correspond to two or more sectors of the directional antenna,
wherein the directional antenna is responsive to control signals provided by the processing circuitry to communicate in a selected one or more of the sectors corresponding to one of the directions.

16. The wireless device of claim 7 wherein the directional antenna is an electronically steerable antenna responsive to control signals provided by the processing circuitry to communicate in a selected one of the directions.

17. The wireless device of claim 7 wherein the directional antenna is a mechanically steerable antenna responsive to control signals provided by the processing circuitry to communicate in a selected one of the directions.

18. The wireless device of claim 7 wherein the processing circuitry determines that the link established in the initially selected direction has deteriorated based on a signal level of signals received through the directional antenna in the initially selected direction from the second wireless device, and
wherein the signal level comprises at least one of a power level, signal-to-noise ratio, a signal-to-noise and interference ratio, a packet-error rate or a throughput level.

19. The wireless device of claim 7 wherein the signals comprise multicarrier signals having a plurality of substantially orthogonal subcarriers comprising millimeter-wave frequencies between 57 and 90 Gigahertz.

20. The wireless device of claim 8 wherein the first and the second wireless devices operate as peer devices in a peer-to-peer wireless network.

21. The wireless device of claim 8 wherein the first and the second wireless devices operate as nodes within a mesh network, and
wherein communications between the first and second wireless device in the initially selected and alternate directions include packets routed on behalf of other wireless devices of the mesh network.

22. Network interface circuitry for configuring a first wireless device to communicate with a second wireless device using a directional antenna in a peer-to-peer millimeter-wave network, the network interface circuitry comprising:
- processing circuitry to initially identify two or more directions for communicating with the second wireless device based on receipt of beacon signals from the second wireless device through the directional antenna, the two or more directions including an initially selected direction and an alternate direction and determined prior to establishment of a link; and
- a millimeter-wave transceiver to establish a link with the directional antenna in the initially selected direction with the second wireless device and to reestablish the link with the directional antenna in the alternate direction if the link in the initially selected direction deteriorates as indicated by the level of signals received through the directional antenna in the initially selected direction falling below a predetermined level for at least a predetermined period of time, the link being automatically reestablished in the alternate direction by performing beam steering with the directional antenna and without regard to signal quality of the link in the alternate direction,
- wherein the alternate direction is a predetermined non-line of sight (NLOS) direction that is different from the initially selected direction for use in reestablishing the link over a different communication path.

23. The network interfaces circuitry of claim 22 wherein the initially selected direction and the alternate direction are selected jointly by the first and second wireless devices.

24. The network interface circuitry of claim 23 wherein when the transceiver reestablishes the link in the alternate direction, the first and second wireless devices concurrently switch to communicating in the alternate direction.

25. The network interface circuitry of claim 23 wherein the processing circuitry identifies the two or more directions for communicating with the second wireless device based on receipt of beacon signals from the second wireless device through the directional antenna,
- wherein the transceiver transmits a beacon signal for receipt by one or more other wireless devices including the second wireless device for use by the one or more wireless devices in identifying the two or more directions for communicating with the first wireless device prior to establishment of the link, and
- wherein the transceiver transmits a signal to notify the second wireless device to reestablish the link in the alternate direction when the link in the initially selected direction deteriorates.

26. The network interface circuitry of claim 24 wherein the link is established over a high-throughput data channel at millimeter-wave frequencies, and
- wherein the first and second wireless devices coordinate the concurrent switching in the alternate direction using a control channel at a microwave frequency.

* * * * *

UNITED STATES PATENT AND TRADEMARK OFFICE
CERTIFICATE OF CORRECTION

PATENT NO. : 8,320,942 B2
APPLICATION NO. : 11/452710
DATED : November 27, 2012
INVENTOR(S) : Sadri et al.

Page 1 of 2

It is certified that error appears in the above-identified patent and that said Letters Patent is hereby corrected as shown below:

On the title page, in column 2, Item (56) under "Other Publications", line 1, before "Design", insert --"--, therefor On the title page, in column 2, Item (56) under "Other Publications", line 3, after "Communications", insert --"--, therefor On title page 2, in column 2, Item (56) under "Other Publications", line 5, delete "J. ," and insert --J.,--, therefor On title page 2, in column 2, Item (56) under "Other Publications", line 7, delete "(Sep. 8, 1998),744-748" and insert --(Sep. 8, 1998), 744-748--, therefor On title page 2, in column 2, Item (56) under "Other Publications", line 8, after "conical", insert --horn--, therefor On title page 2, in column 2, Item (56) under "Other Publications", line 10, delete "(2004),280-282" and insert --(2004), 280-282--, therefor On title page 2, in column 2, Item (56) under "Other Publications", line 11, delete "T. ," and insert --T.,--, therefor On title page 2, in column 2, Item (56) under "Other Publications", line 14, delete "(2003),233-236" and insert --(2003), 233-236--, therefor On title page 2, in column 2, Item (56) under "Other Publications", line 15, delete "X. ," and insert --X.,--, therefor On title page 2, in column 2, Item (56) under "Other Publications", line 21, delete "Mailed" and insert --mailed--, therefor Signed and Sealed this
Eighteenth Day of November, 2014

Michelle K. Lee
*Deputy Director of the United States Patent and Trademark Office*

On title page 2, in column 2, Item (56) under "Other Publications", line 50, delete "mailed" and insert --filed--, therefor On title page 2, in column 2, Item (56) under "Other Publications", line 54-55, delete "Sep. 19, 2011" and insert --Sep. 29, 2011--, therefor On title page 3, in column 1, Item (56) under "Other Publications", line 18, delete "pg." and insert --pgs.--, therefor On title page 3, in column 1, Item (56) under "Other Publications", line 20, delete "dated" and insert --mailed--, therefor On title page 3, in column 2, Item (56) under "Other Publications", line 7, after "Application", insert --Serial--, therefor On title page 3, in column 2, Item (56) under "Other Publications", line 7, delete "2009510911" and insert --2009-510911--, therefor On title page 3, in column 2, Item (56) under "Other Publications", line 11, delete "U.S. Appl." and insert --Serial--, therefor On title page 3, in column 2, Item (56) under "Other Publications", line 12, delete "dated" and insert --mailed--, therefor On title page 3, in column 2, Item (56) under "Other Publications", line 17, delete "12/301,669 ," and insert --12/301,669,--, therefor On title page 3, in column 2, Item (56) under "Other Publications", line 40, delete "Ocr." and insert --Oct.--, therefor In the Claims In column 13, line 5, in Claim 22, delete "peer-to- peer" and insert --peer-to-peer--, therefor